US005712757A

United States Patent [19]

Bennett et al.

[11] Patent Number: 5,712,757

[45] Date of Patent: Jan. 27, 1998

[54] SURGE ARRESTER HAVING RIDGED TERMINALS

[75] Inventors: Jeffrey A. Bennett, Sunnyvale; William M. Robinson, Palo Alto; John Seymour Mattis, Sunnyvale; Chuck F. Cooper, Mountain View, all of Calif.

[73] Assignee: Raychem Corporation, Menlo Park, Calif.

[21] Appl. No.: 672,184

[22] Filed: Jun. 27, 1996

[51] Int. Cl.$^6$ .......... H02H 1/04

[52] U.S. Cl. .......... 361/127; 361/118

[58] Field of Search .......... 361/117, 118, 361/126–127, 134, 119; 338/20, 21, 22 R

[56] References Cited

U.S. PATENT DOCUMENTS

| | | | |
|---|---|---|---|
| 3,283,196 | 11/1966 | Parker et al. | 313/231 |
| 4,262,318 | 4/1981 | Shirakawa et al. | 361/127 |
| 4,423,404 | 12/1983 | Goedde et al. | 338/21 |
| 4,424,547 | 1/1984 | Titus et al. | 361/127 |
| 4,587,592 | 5/1986 | Nakano et al. | 361/127 |
| 4,656,555 | 4/1987 | Raudabaugh | 361/117 |
| 4,729,053 | 3/1988 | Maier et al. | 361/118 |
| 4,752,760 | 6/1988 | Clark | 337/248 |
| 4,812,944 | 3/1989 | Eberhard et al. | 361/127 |
| 4,825,188 | 4/1989 | Parraud et al. | 338/21 |
| 4,833,438 | 5/1989 | Parraud et al. | 338/21 |
| 4,851,955 | 7/1989 | Doune | 361/117 |
| 4,853,670 | 8/1989 | Stengard | 338/21 |
| 4,905,118 | 2/1990 | Sakich | 361/117 |
| 4,989,115 | 1/1991 | Bourdages et al. | 361/126 |
| 5,043,838 | 8/1991 | Sakich | 361/117 |
| 5,138,517 | 8/1992 | Raudabaugh | 361/117 |
| 5,159,158 | 10/1992 | Sakich et al. | 174/179 |
| 5,291,366 | 3/1994 | Giese et al. | 361/127 |
| 5,363,266 | 11/1994 | Wiseman et al. | 361/127 |
| 5,444,429 | 8/1995 | Sakich et al. | 338/21 |
| 5,517,382 | 5/1996 | Leupp et al. | 361/118 |

FOREIGN PATENT DOCUMENTS

| | | | |
|---|---|---|---|
| 0683496A1 | 11/1995 | European Pat. Off. | H01C 7/12 |
| 63-045805 | 2/1988 | Japan | H01C 7/12 |
| 63-312602 | 12/1988 | Japan | H01C 7/12 |
| 0816926 | 7/1959 | United Kingdom . | |
| 0902197 | 7/1962 | United Kingdom . | |
| 2073965 | 5/1984 | United Kingdom | H01T 5/00 |

OTHER PUBLICATIONS

Derwent Abstract 88–237773 (abstract of NGK Insulators JP 63–169702 (1988).

Raychem Surge Arrester Systems brochure entitled "PolyGarde" (Oct. 1995).

*Primary Examiner*—Jeffrey A. Gaffin
*Assistant Examiner*—Michael Sherry
*Attorney, Agent, or Firm*—Herbert G. Burkard; Yuan Chao

[57] ABSTRACT

A surge arrester includes varistor elements forming a stack and having opposed end surfaces. The varistor stack is electrically connected via the opposed end surfaces to end terminals having circumferential ridges, which, in the event of failure of the varistor elements, are designed to relocate the resulting arc and direct it in a manner which reduces or minimizes damage to the surge attester. The ridges serve as damage-tolerant sacrificial rooting points for an arc in the event of varistor element failure by presenting a substantial metal mass for the arc to erode away.

22 Claims, 8 Drawing Sheets

SURGE ARRESTER HAVING RIDGED TERMINALS

TECHNICAL FIELD OF THE INVENTION

This invention relates to surge arresters for protecting electrical equipment.

BACKGROUND OF THE INVENTION

Surge arresters are used to protect equipment connected to power distribution networks from damage by excessive voltage situations caused by lightning strikes, switching surges, incorrect connections, and other abnormal conditions or malfunctions.

The active element in a surge arrester often is a varistor, also referred to as a non-linear resistor because it exhibits a nonlinear current-voltage relationship. If the applied voltage is less than a certain voltage (the switching or clamping voltage) the varistor is essentially an insulator and only a small leakage current flows through it. If the applied voltage is greater than the switching voltage, the varistor's resistance drops, allowing an increased current to flow through it. That is, a varistor is highly resistive below its switching voltage and substantially conductive above it. The voltage-current relationship of a varistor is described by the equation $$I=\left(\frac{V}{C}\right)^{\alpha}$$

where I is the current flowing through the varistor; V is the voltage across the varistor; C is a constant which is a function of the dimensions, composition, and method of fabrication of the varistor; and $\alpha$ (alpha) is a constant which is a measure of the nonlinearity of the varistor. A large $\alpha$, signifying a large degree of nonlinearity, is desirable.

The surge arrester is commonly attached to an electrical power system in a parallel configuration, with one terminal of the device connected to a phase conductor of the electrical power system and the other terminal to ground or neutral. At normal system voltages, the surge arrester is resistant to current flow (except for the leakage current). But if an overvoltage condition exceeding the switching voltage develops, the surge arrester becomes conductive and shunts the surge energy to ground while "clamping" or limiting the system voltage to a value which can be tolerated without damage by the equipment being protected.

Commonly, a surge arrester contains a plurality of varistor elements arranged in a stack and electrically connected in series. Terminals attached to the ends of the stack connect the varistors to system and ground. In order to maintain good electrical contact between the various components, a spring or other means may be introduced (for example between two adjacent varistors or between the end of the stack and one of the terminals) to apply a compressive force to the components. A housing, typically made of porcelain or polymer, protects the stack from the environment and insulates it electrically. Surge arresters containing a single varistor instead of a stack also are known.

Because of the high voltages encountered in power distribution networks, varistor failure may occur. Arcing currents may flow through or over the varistor material, a hot plasma developing inside the housing. The resulting high pressures cause the hot plasma to be expelled through the housing material, and arcing then takes place along the exterior of the varistor. It is desirable that, in such an event, the arc be moved away from the varistors and structural components of the varistor, to minimize damage. While the terminals are possible candidate sites for relocation of the arc, the terminals themselves are vulnerable if the arc relocates to a part thereof which serves a structural function (such as holding other elements of the surge arrester in place) and such part comprises relatively thin metal which can be rapidly eroded away. The instant invention provides a surge attester having terminals which include relocating sites for the arc, such relocating sites being thick and not serving a structural function, so that their erosion does not compromise the structural integrity of the surge arrester.

SUMMARY OF THE INVENTION

This invention provides a surge arrester, comprising

- a surge arresting means comprising at least one varistor element and having first and second opposed end surfaces and a lateral surface;
- first and second electrically conductive terminals; each terminal having inner and outer facing end surfaces and a side surface; the inner facing end surface of the first terminal electrically contacting the first opposed end surface of the surge arresting means and the inner facing end surface of the second terminal electrically contacting the second opposed end surface of the surge arresting means; each terminal having a ridge projecting from the side surface thereof at a location adjacent to the inner facing end surface and circumscribing the side surface;
- structural means for holding the first and second terminals in electrical contact with the surge arresting means and imparting structural strength to the surge arrester, disposed around the lateral surface of the surge arresting means and fastened to the first and second terminals at fastening sites on or near the side surface thereof; and
- a housing made of a polymeric material, wherein the polymeric material covers the surge arresting means, the structural means, and the fastening sites on the first and second terminals but leaves uncovered at least part of the ridges.

In a preferred embodiment, the surge arresting means comprises a plurality of varistor elements electrically connected in series and forming a stack of such varistor elements. In an alternative embodiment, the surge arresting means comprises a single varistor element.

Preferably, the polymeric material of the housing fills the space between the structural means and the surge arresting means.

Preferably, the structural means comprises a plurality of elongate strength members disposed around the lateral surface of the surge arresting means but spaced apart therefrom. Each terminal has a plurality of recesses on a surface thereof facing the surge arresting means. Each strength member has first and second ends, each of which fits into a recess and is tightly held within its respective recess by crimping of the respective terminal and consequent deformation of the recess. The elongate strength members are held under tension and apply a compressive force to the surge arresting means, ensuring good electrical contact between the surge arresting means and the terminals and imparting structural rigidity to the surge arrester. The polymeric material of the housing covers those portions of the lateral surface of the terminals underneath which lie the recesses.

A surge arrester of this invention is advantageous in that it enables the effective and fast arc transfer from its point of origin to a location which is more damage resistant or tolerant. Such a surge arrester can be used to protect electrical equipment, especially those in electrical power distribution networks, from damage due to surges in the system voltage.

BRIEF DESCRIPTION OF THE DRAWING(S)

FIG. 1 shows a surge arrester of this invention. FIGS. 1*a* and 1*b* show various embodiments of a terminal of this invention. FIG. 1*c* shows an optional compression member for use with the surge arrester of FIG. 1, while FIG. 1*d* shows the compression member installed between a varistor element and a terminal. FIG. 1*e* shows a different view of a part of the surge arrester of FIG. 1.

FIG. 2 shows a preferred embodiment of the invention. FIG. 2*a* and 2*b* show two variations of the embodiment of FIG. 2.

FIGS. 3*a* and 3*b* compare preferred and less preferred positions for sheds on the housing.

FIGS. 4*a* and 4*b* show how, in the event of varistor failure, an are roots in a surge arrester without the terminals of this invention, compared to a surge arrester having such terminals.

FIG. 5 shows yet another surge arrester of this invention.

Herein, numerals repeated from one figure to another denote like or equivalent elements.

DESCRIPTION OF THE PREFERRED EMBODIMENTS

Figure 1:
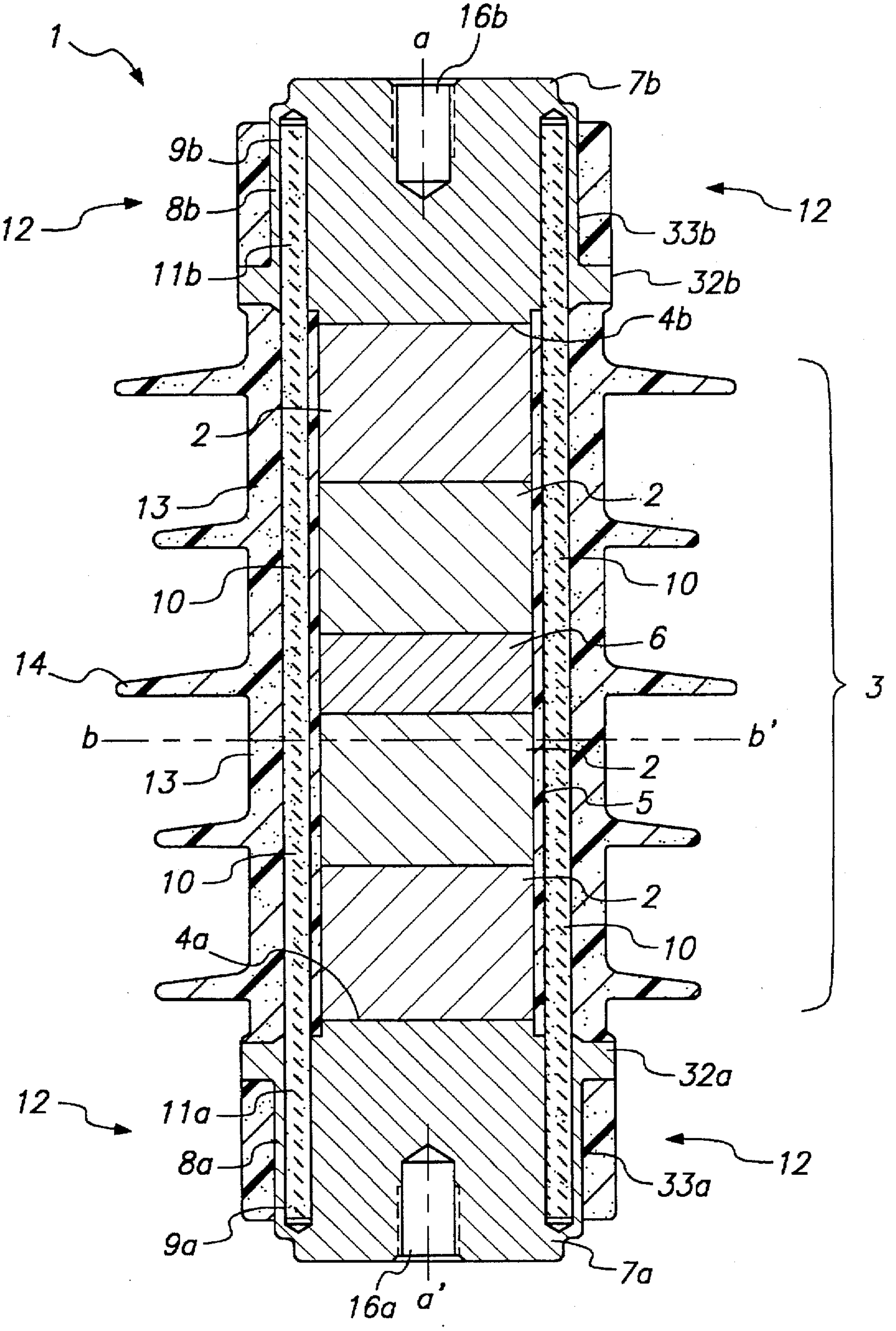

FIG. 1 shows a surge arrester 1 of this invention. A plurality of varistor elements 2 forms a stack 3 having opposed end surfaces 4*a* and 4*b* and a lateral surface 5. Preferably varistor elements 2 are disk-shaped, so that stack 3 is cylindrical. Optional spacer 6 lies between two adjacent varistor elements 2 and is made of a conductive material such as metal, in particular aluminum. Alternatively, spacer 6 may be positioned between a varistor element 2 and a terminal 7*a* or 7*b*. Stack 3 is held between first and second terminals 7*a* and 7*b*, engaging stack 3 at end surfaces 4*a* and 4*b* and making electrical contact therewith. Terminals 7*a* and 7*b* are made of a metal such as aluminum and serve as the means by which surge arrester 1 is connected to ground and system. It is to be understood that, although FIG. 1 depicts a stack of four varistor elements 2, such a number is illustrative only and a greater or lesser number of varistor elements (including one single varistor element) can be used.

In some overvoltage situations, there may be varistor failure. When the varistor fails, arcing currents may flow through or over the varistor material, developing a plasma at the varistor or areas immediately adjacent thereto. High pressures develop and the hot plasma gases may be expelled through the housing material. It is desirable in such circumstances that the ensuing arc be moved away from the varistor elements and towards locations more forgiving of or resistant towards damage, such as thicker sections of the end terminals, or sections not peforming a structural function, thereby minimizing or reducing damage to the varistors and other damage-prone components. The greatest potential for damage is at the points where the arc roots. Therefore, a useful strategy is to move the arc's roots to locations which are more damage-tolerant or resistant. This can be achieved by directing the conductive plasma to form a continuous path to a preferred rooting location. One possible location is an exposed part of a terminal. However, in a conventional surge arrester design, the housing covers almost all of the terminals, so that the plasma has a long and convoluted path before finding its way to an exposed part of the terminal. Arcing tends to continue at the interface between the varistor elements and the housing, causing much damage. Further, not all parts of a terminal are necessarily damage resistant or tolerant. Thinner sections may in fact be fairly damage sensitive. It is only at thicker, more robust locations of a terminal that the are, once rooted, must erode a considerable amount of metal before causing serious damage. In a conventional surge arrester, there is no assurance that, even if an are were to be transferred to a terminal, it would root at such a location.

A surge arrester of this invention solves this problem by providing a location in terminals 7*a* and 7*b* where an arc can root and not cause serious damage, the terminals being designed such that the are rapidly and efficiently transfers there, before causing serious damage. Returning to FIG. 1, terminals 7*a* and 7*b* have ridges 32*a* and 32*b*, respectively, which project from the side surface 33*a* or 33*b* of the respective terminal and which in the completed surge arrester are left at least partially uncovered by housing 13 (in this instance the tops of the ridges being uncovered). Ridges 32*a* and 32*b* circle side surfaces 33*a* and 33*b*, respectively, and are located adjacent to the inner facing end surfaces of the respective terminals. If an are forms, plasma will be ejected through housing 13 outside the skirted region and immediately adjacent to the exposed metal of ridge 32*b* or 32*a*, as the case may be. The plasma can form there a direct terminal-to-terminal arc, rooting on ridges 32*a* and 32*b* as the preferred rooting locations and following a pathway through the atmosphere, removed from the arrester core, avoiding or limiting further damage to the surge arrester. In effect, ridges 32*a* and 32*b* serve as sacrificial rooting points for the arc. They present a substantial metal mass for the are to erode away, before damage to the surge arrester occurs.

Turning now to the other features shown in FIG. 1, bores 16*a* and 16*b* in terminals 7*a* and 7*b*, respectively, are for receiving studs via which electrical connection is made to system or ground. Bores 16*a* and 16*b* may be smooth surfaced, as shown here, or threaded. Terminals 7*a* and 7*b* also have flanges 8*a* and 8*b*, respectively, extending beyond lateral surface 5 of stack 3. Flanges 8*a* and 8*b* each have a plurality of recesses 9*a*, 9*b*, respectively, opening to face stack 3. The assembly of terminals 7*a*, 7*b*, and stack 3 is held together by a plurality of strength members 10. Each strength member 10 has first and second ends 11*a* and 11*b* fitting into a corresponding recess 9*a* and 9*b*. Strength members 10 are preferably disposed symmetrically around stack 3, about longitudinal axis a–a', but an asymmetric disposition also is within the scope of this invention. Strength members 10 are spaced apart from lateral surface 5. Preferably, there are 4 or 6 strength members, but a greater or lesser number, even or odd, can be used. Ends 11*a*, 11*b* are tightly gripped inside recesses 9*a*, 9*b* by crimping terminals 7*a*, 7*b* at their exterior surfaces, at the locations generally indicated by arrows 12. During the crimping step, stack 3 and terminals 7*a*, 7*b* are held under compression so that, after crimping, strength members 10 (which are reciprocally under tension) hold stack 3 under compression, ensuring good electrical contact among varistor elements 2 and between end surfaces 4*a*, 4*b* and terminals 7*a*, 7*b*. Thus, crimped recesses 9*a*, 9*b* serve as fastening sites for strength members 10, in this instance being located just underneath side surfaces 33*a* and 33*b*.

Figure 1A:
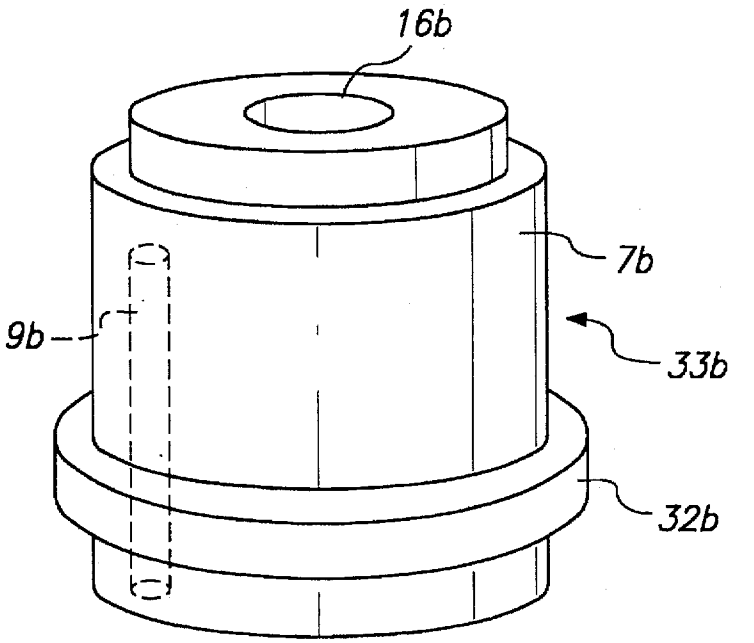
Figure 1B:
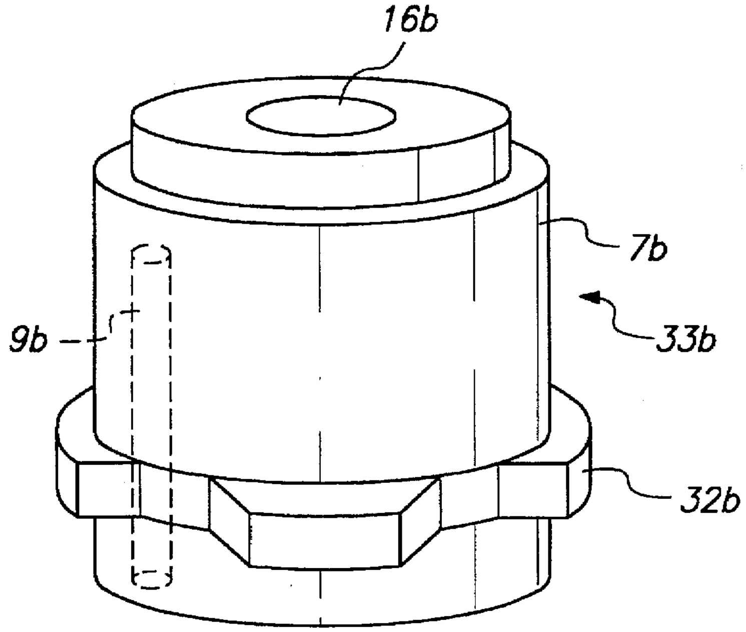

Ridges 32*a* and 32*b* independently can be continuous or discontinuous. FIGS. 1*a* and 1*b* illustrate alternative designs, in a perspective view of terminal 7*b*. In FIG. 1*a*, ridge 32*b* is continuous, circumscribing side surface 33*b* without any break. FIG. 1*b* exemplifies a discontinuous (segmented) ridge 32*b*, comprising plural segments arranged in a castellated pattern around side surface 33*b* and substantially circumscribing it, with the gaps as shown. In these figures, it is to be understood that only a single recess 9b is depicted for the sake of simplicity and that in fact plural recesses 9b are present. While it is preferred that each ridge 32a and 32b be of the same design, such is not required.

Strength members 10 preferably are made of a composite such as pultruded glass fiber reinforced resin, combining the better properties of glass (strong but with little elongation) and polymer resin (weaker but with good elongation and ability to bond glass to glass). The polymeric resin preferably is epoxy or vinyl ester resin. In pultrusion, a glass reinforced composite is made by impregnating continuous bundles of glass fibers with a liquid resin, then heating at an elevated temperature to cure the resin. Such materials are very strong in tension and have adequate bending strength—both requirements for strength members 10. Also, they have excellent electrical properties and retain their electrical and mechanical properties at elevated temperatures. The ductility is still within acceptable limits, even though it is more ductile than glass. Alternative materials may be used, but are less preferred, including ceramics (e.g., porcelain), which have the strength but not the toughness of composites, and organic materials such as aramid (e.g., Kevlar™) or nylon, despite limitations such as lesser electrical properties or mechanical strength, increased creep, or increased moisture uptake.

A housing 13, made of a polymeric material, is molded around the assembly such that the polymeric material encloses stack 3 and strength members 10 and fills the space between strength members 10 and stack 3. Housing 13 also partially covers terminals 7a, 7b. Housing 13 may have sheds 14 for increasing the surface leakage current path and is made of a tracking resistant material, such as appropriately formulated polyolefin polymers and copolymers such as ethylene-vinyl acetate copolymer (EVA), ethylene-propylene-diene monomer terpolymer (EPDM), and ethylene-propylene rubber (EPR), or silicone, or the like. Silicone and EVA are preferred. It is also noteworthy that the polymeric material of housing 13 covers flanges 8a and 8b, underneath which lies recesses 9a and 9b, to prevent flanges 8a and 8b, which are relatively thin and vulnerable to weakening by erosion, from serving as rooting points for an arc.

Spacer 6 is made of a thermally and electrically conductive material such as a metal and serves a variety of functions. It is a heat sink for assisting the dissipation of the large amount of heat generated by current flowing through varistor elements 2. It helps spread the current flowing through stack 3 evenly throughout its cross-section. It also can prevent the material of housing 13 from ingressing during the molding operation. Lastly, spacer 6 serves a spacing function. During manufacture, it is desirable to make a series of surge arresters with different voltage ratings but with the same overall size, to simplify manufacturing. This can be achieved by varying the thickness and number of varistor elements 2, but inserting one or more appropriately sized spacers 6, so that the overall size of stack 3 and therefore surge arrester 1 remains constant. Thus, as used herein, a reference to a stack of varistors includes a stack in which one or more spacer elements separate the constituent varistor elements. Spacer 6 may alternatively be positioned between a varistor element 2 and a terminal 7a or 7b.

Figure 1C:
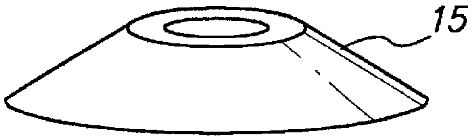
Figure 1D:
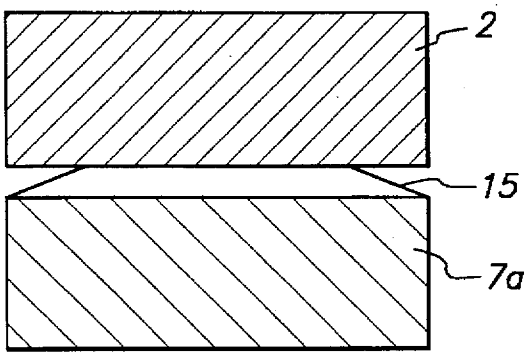

To further ensure good electrical contact, a compression member may be present, positioned between two components of stack 3 (e.g., between two varistor elements 2 or between a varistor element 2 and spacer 6), or between an end surface 4a and the corresponding terminal. FIG. 1c shows an exemplary compression member 15 which can be used, specifically a Belleville washer. FIG. 1d shows in partial longitudinal cross section compression member 15 disposed between a varistor element 2 and terminal 7a. Thus, when it is stated herein that a terminal (7a or 7b, as the case may be) contacts an end surface (4a or 4b, as the case may be), such statement includes indirect contact, via an intervening element such as compression member 15 or spacer 6. To maintain electrical continuity, the compression member should be made of a conductor such as metal. The compression member can be a spring, such as the aforementioned Belleville washer, a circular spring, a disk spring, a disk spring with radial corrugations, a disk with finger spring members, and the like.

Figure 1E:
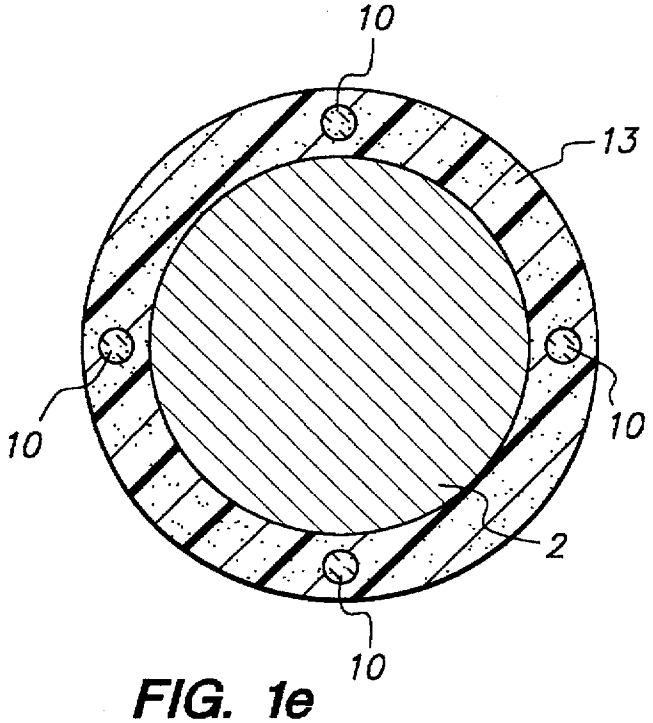

FIG. 1e is a transverse cross-section of arrester 1 of FIG. 1, taken along line b–b', showing the placement of the four strength members 10 around varistor element 2 and how the material of housing 13 fills the space between strength members 10 and varistor elements 2 without leaving voids.

Figure 2:
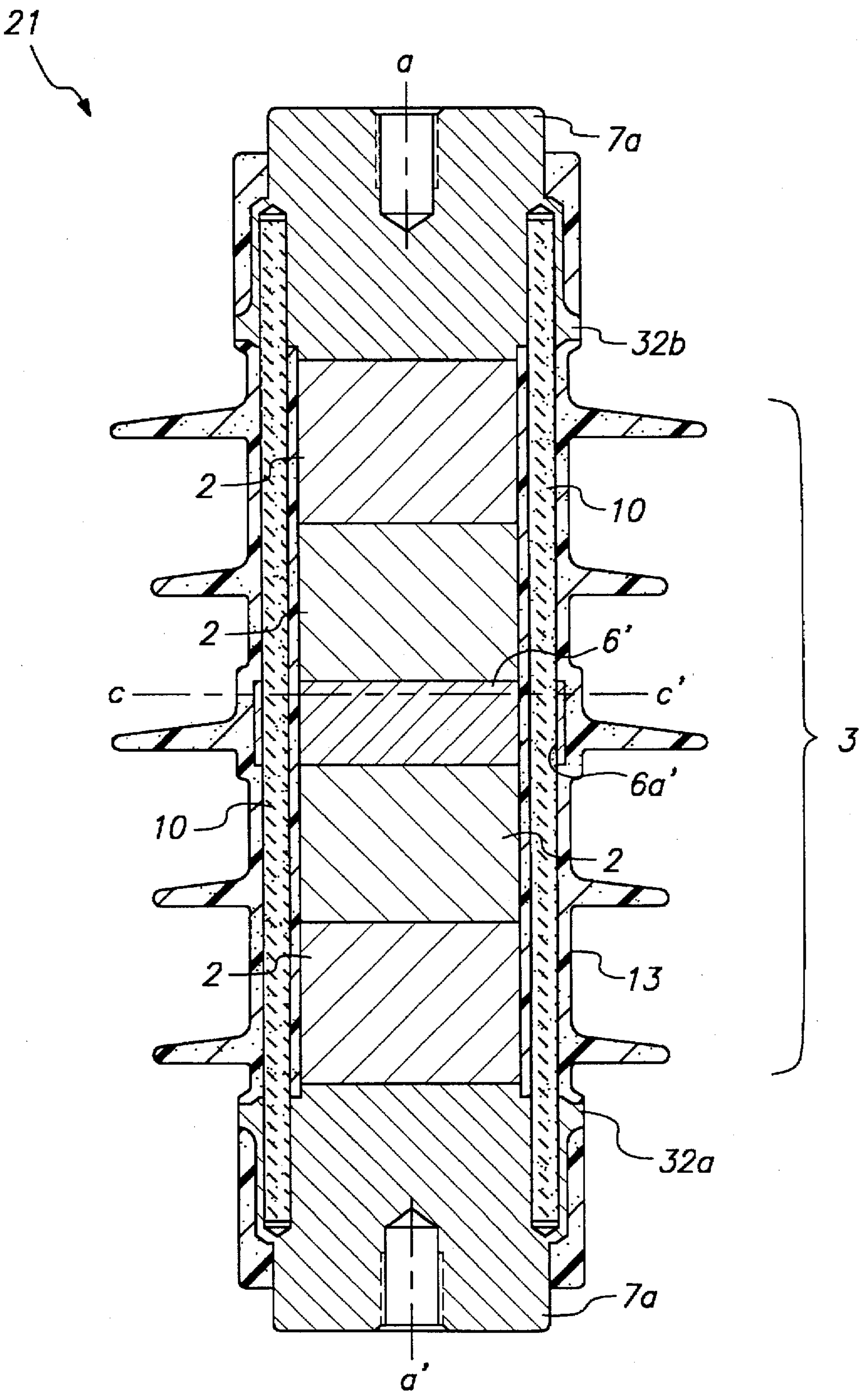
Figure 2A:
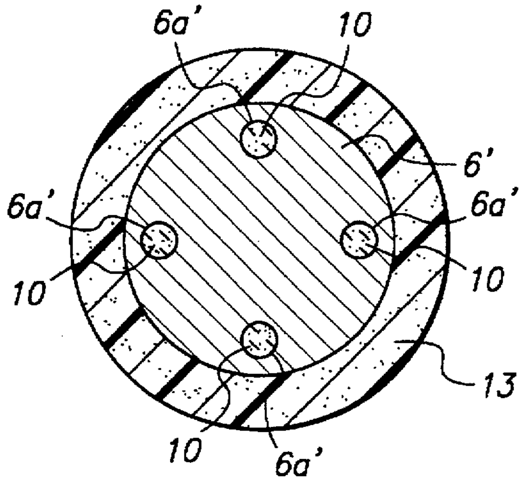
Figure 2B:
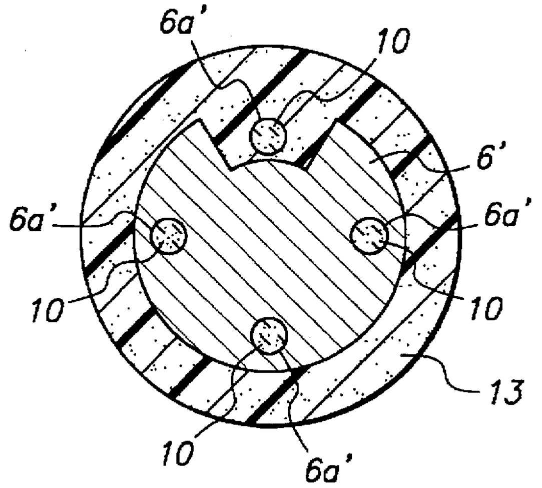

FIG. 2 shows another embodiment of the invention. Arrester 21 of this figure differs from arrester 1 of FIG. 1 in the design of the spacer element. Here, spacer 6' extends beyond the lateral surface of stack 3 and contains at least one passageway 6a' through which passes a strength member 10. Thus, spacer 6' also performs a reinforcing function, bracing the strength members around the middle of the stack. Spacer 6' preferably is disposed near the longitudinal middle of surge arrester 21 for most effective reinforcement, as opposed to near one of terminals 7a or 7b. To further illustrate this embodiment, reference is made to FIG. 2a and 2b, which are transverse cross-sections taken along line c–c' of FIG. 2. FIG. 2a shows how spacer 6' has four passageways 6a', through each of which passes a strength member 10. Although it is desirable to have a one-to-one relationship between passageways 6a' and strength members 10 for most effective reinforcement effect, such a relationship is not mandatory. As shown in FIG. 2b, not all strength members 10 need to pass through a passageway 6a'.

The design and manufacture of surge arresters having strength members, such as shown in FIGS. 1 and 2, is further described in commonly assigned, copending U.S. patent application of Robinson et al., Ser. No. 08/673,767, filed even date herewith under the title "SURGE ARRESTER", the disclosure of which is incorporated herein by reference. Reference is also made to commonly assigned, copending U.S. patent application of Bennett et al., Ser. No. 08/672,733, filed even date herewith under the title "SURGE ARRESTER HAVING GROOVED AND RIDGED TERMINALS", the disclosure of which is also incorporated herein by reference.

Figure 3A:
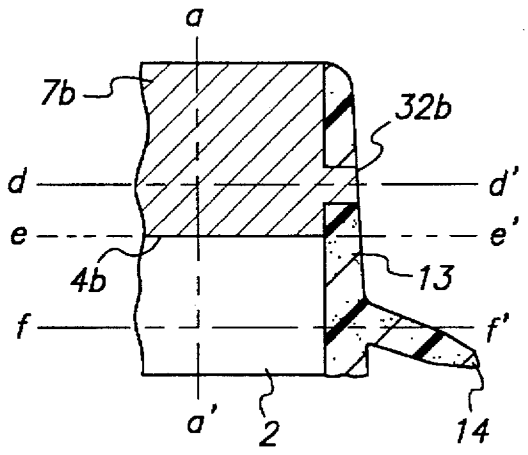
Figure 3B:
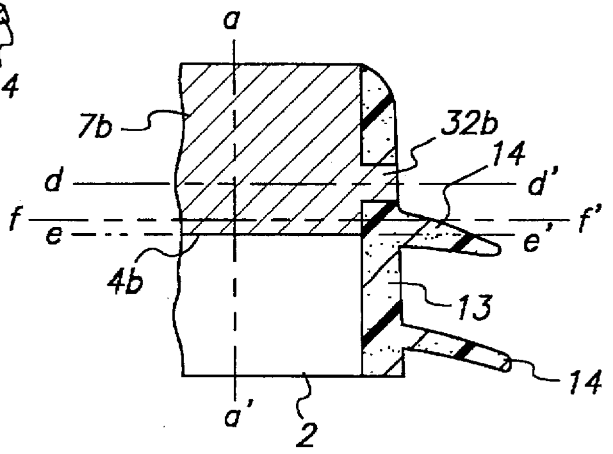

The positioning of sheds 14 on housing 13 is a factor which merits discussion. FIGS. 3a and 3b show preferred and less preferred variations, respectively. (For the sake of simplicity, the structural means for holding the terminal and the varistor element against each other is not shown.) In FIG. 3a, shed 14 is positioned away from (below) end surface 4b, where varistor element 2 and terminal 7b contact each other. Since it is at or near such a location that plasma is likely to form in the event of a malfunction, shed 14 does not hinder the transfer of the rooting point of the ensuing are to ridge 32b. In comparison, in FIG. 3b one of sheds 14 is positioned near (level with or above) end surface 4b. A shed so positioned will hinder are transfer to ridge 32b, as it is an insulating material forming a barrier between the original rooting point and ridge 32b and deflecting ejected plasma away from ridge 32b. That is, in a projection onto longitudinal axis a–a', it is preferred that there not be any shed 14 positioned even with end surface 4b or between end surface 4b and ridge 32b. This concept is more clearly illustrated by reference to lines d–d', e–e', and f–f', which indicate the relative positions of the perpendicular projections of ridge 32b, end surface 4b, and shed 14 onto longitudinal axis a–a'. In FIG. 3a, the distance between end surface 4b and ridge 32b is less than the distance between shed 14 and ridge 32b, when measured along the projection onto longitudinal axis a–a'. In FIG. 3b, the reverse occurs.

Figure 4A:
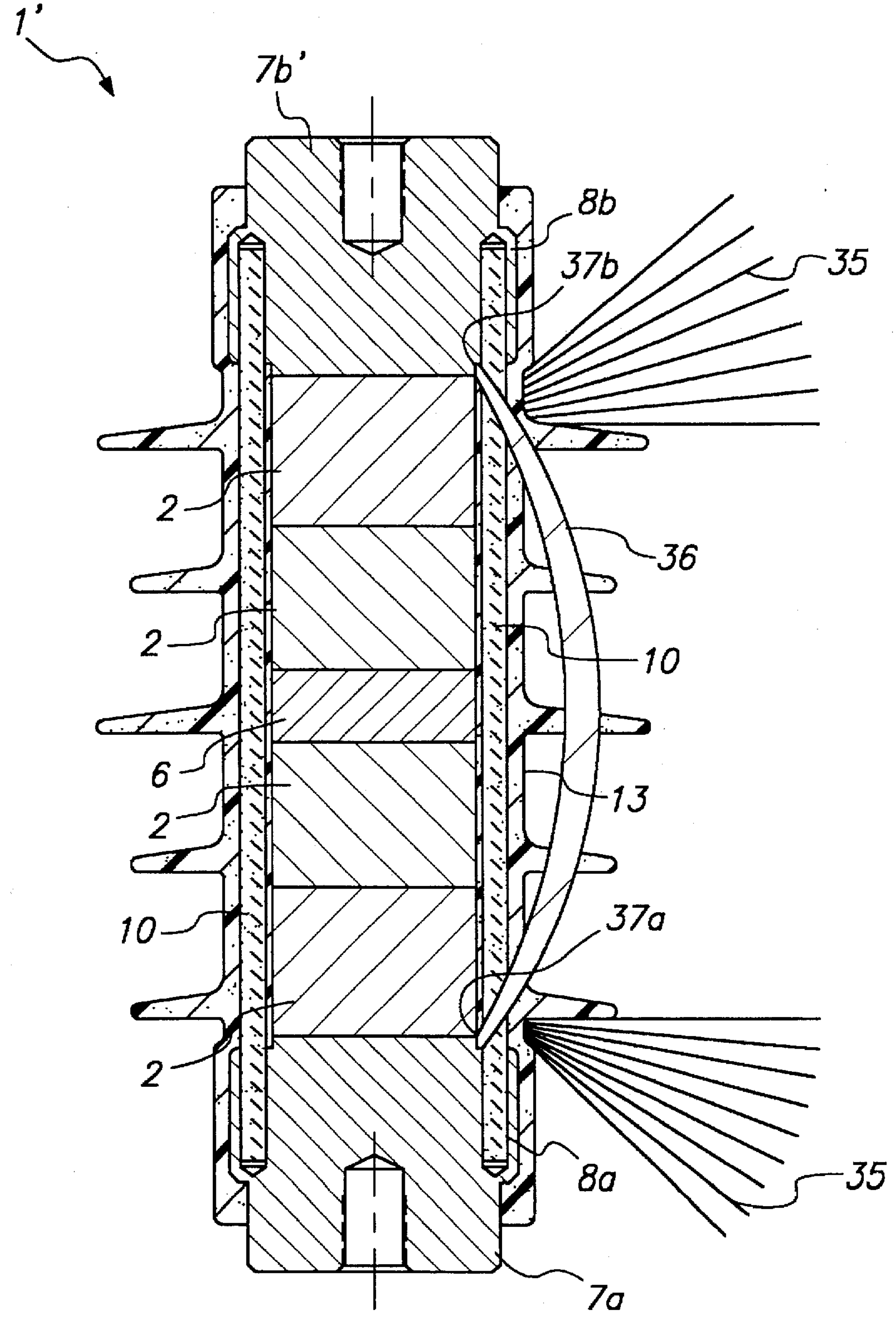

FIG. 4a shows a surge arrester 1' which is identical to surge arrester 1 of FIG. 1, except for the absence of circumferential ridges 32a and 32b. In the event of varistor failure at likely failure loci 37a and 37b, high internal pressures are generated and plasma 35 ruptures the polymeric material of housing 13 and vents therethrough. The plasma, which is conductive, permits an are 36 to be established between terminals 7a and 7b, with failure loci 37a and 37b as the initial rooting points. In the absence of other suitable rooting points, the arc remains rooted there and can cause extensive damage to adjacent varistor elements 2, adjacent strength members 10, housing 13, and terminals 7a and 7b. Even if the arc were to transfer to and root on flanges 8a and 8b—unlikely considering they are covered by housing 13 which acts as an insulating barrier—flanges 8a and 8b are relatively thin and are vital for holding strength members 10 firmly in place. Erosion of the metal of flanges 8a and 8b will lead to loosening of strength members 10, threatening the structural integrity of the entire surge arrester 1'.

Figure 4B:
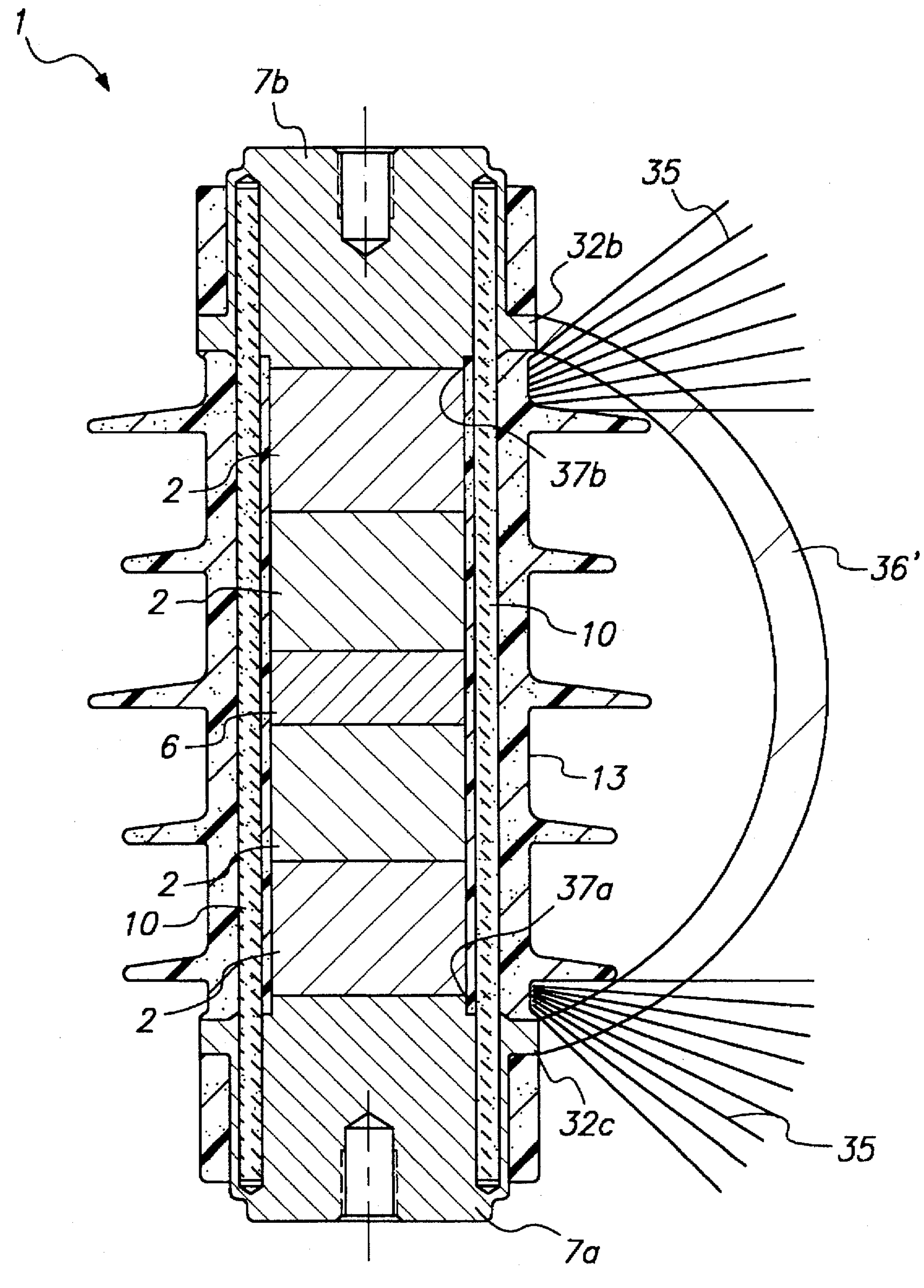

FIG. 4b shows how, in comparison, such destructive arcing is avoided by the presence of ridges 32a and 32b in a surge arrester 1 according to this invention. In the event of a failure as described above at failure loci 37a and 37b, nearby ridges 32a and 32b are uncovered at least in part by housing 13 and serve as conveniently accessible and unobstructed rooting locations for relocated arc 36'. Therefore, arc 36 transfers and roots there. As shown in FIG. 3b, relocated are 36' travels a path that passes outside of housing 13 and away from strength members 10, thereby avoiding damaging them. Further, ridges 32a and 32b possess substantial metallic mass, so that substantial time is required before arc 36' finishes eroding them and starts eroding underlying flanges 8a and 8b. During the slow erosion of ridges 32a and 32b, there is minimal damage to surge arrester 1.

The advantage of a surge arrester having ridged terminals according to the invention was demonstrated as follows. A first surge arrester, of the ridge-less design shown in FIG. 4a, was caused to fail internally by input of excessive electrical energy, with failure initiating in the varistor elements. Plasma burst through the polymeric housing and the ensuing are rooted on the inner facing surfaces of the terminals and caused substantial damage to the varistor elements, strength members, and housing. A second surge arrester of the same design but constructed of different materials was subjected to the same test method. This time, the arc sometimes transferred to the outer facing end surfaces of the end terminals, but did not do so consistently. The transfer time, when transfer did occur, exceeded 15 msec. There was substantial damage to the varistor elements and to some strength members.

In comparison, a surge arrester of the design of FIG. 1—that is, according to this invention—was subjected to the same test method. In all cases, the arc transferred quickly to the preferred arc rooting locations (the ridges), in less than 5 msec. Damage to the varistor elements and strength members was minimal.

The present invention is suitable not only for the surge arrester designs illustrated in the foregoing figures, but also to surge arresters generally in which the structural means is disposed around the periphery of the surge arresting element and is fastened to the end terminals by one of the many diverse methods known in the art, including, without limitation, filament windings engaging shoulders on the terminals; rods fastened by threaded nuts; screwed-in prepreg fiberglass sections; and heat recoverable polymer strands secured to the end terminals. Exemplary disclosures include: Titus et al., U.S. Pat. No. 4,424,547 (1984); Raudabaugh, U.S. Pat. No. 4,656,555 (1987) (Raudabaugh '555); Eberhard et at., U.S. Pat. No. 4,812,944 (1989); Stengard, U.S. Pat. No. 4,853,670 (1989); Boardages et at., U.S. Pat. No. 4,989,115 (1991); Sakich, U.S. Pat. No. 5,043,838 (1991) (Sakich '838); Raudabaugh, U.S. Pat. No. 5,138,517 (1992) (Raudabaugh '517); Giese et at., U.S. Pat. No. 5,291,366 (1994); Wiseman et at., U.S. Pat. No. 5,363,266 (1994); and NGK Insulators, JP 63-312602 (1988); the disclosures of which are incorporated herein by reference.

Figure 5:
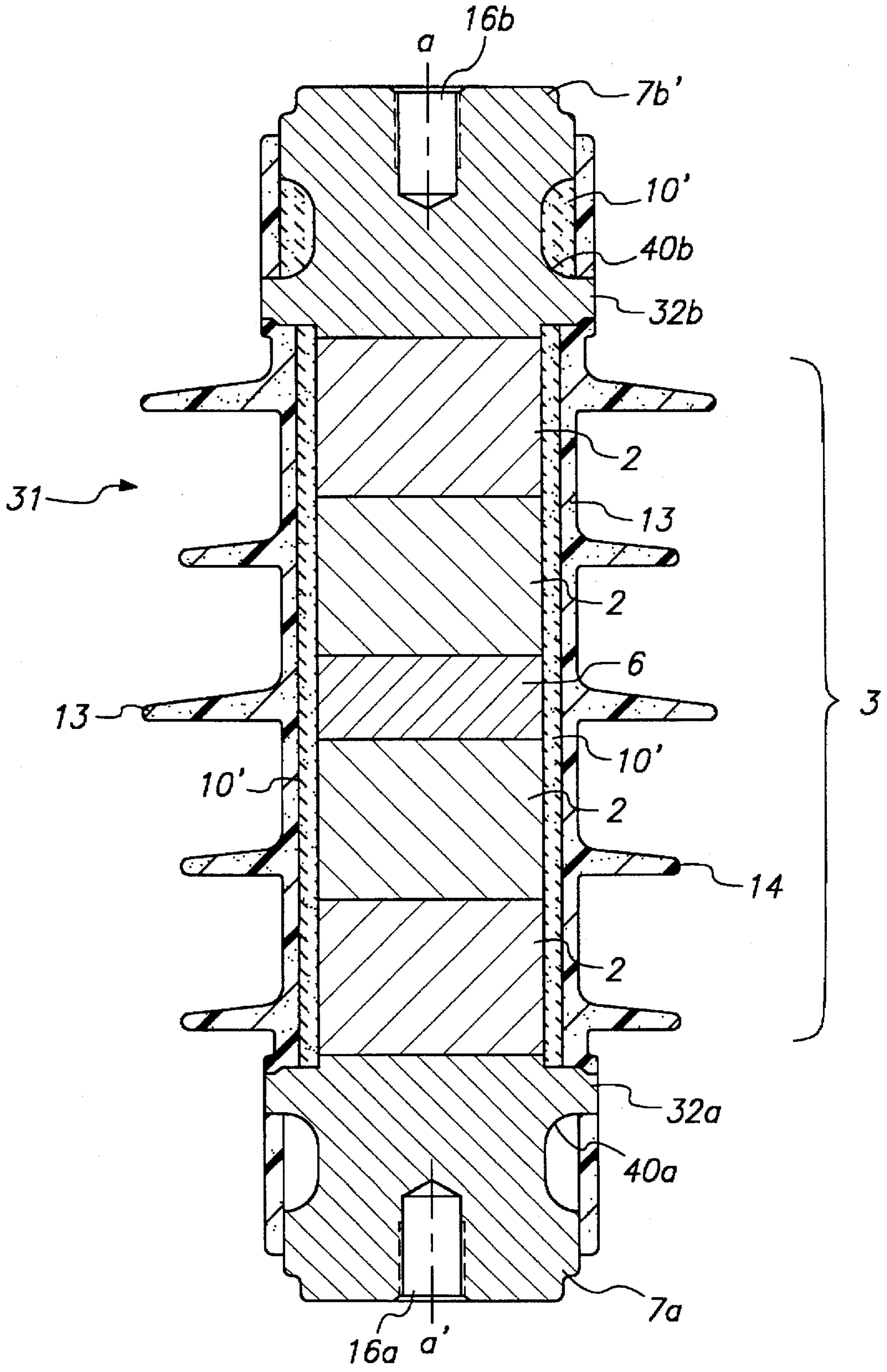

In another preferred embodiment of the invention, the means for holding the first and second terminals in electrical contact with the surge arresting means comprises a filament winding of an electrically non-conductive material such as fiberglass or nylon. Referring to FIG. 5, a surge arrester 31 is shown which is the same as surge arrester 1 of FIG. 1, except that elongate strength members 10 of FIG. 1 have been replaced with a filament winding 10'. To accommodate filament winding 10', ridges 32a and 32b should be of the discontinuous design. Filament winding 10' wraps through gaps in ridges 32a and 32b and engages shoulders 40a and 40b on terminals 7a and 7b, respectively, applying a compressive force to stack 3 and holding terminals 7a and 7b in electrical contact with varistor stack 3. Filament winding 10' covers shoulders 40a and 40b, which thus serve as fastening sites, and in turn is covered by the polymeric material of housing 13. Thus, when it is said herein that the polymeric material of housing 13 covers the fastening sites on the terminals, such indirect coverage is also contemplated. Filament winding 10' may be impregnated with a polymer resin such as epoxy or vinyl ester resin. The design of surge arresters employing filament windings suitable for use with this invention is further described in the aforementioned Raudabaugh '555, Sakich '838, and Raudabaugh '517.

A common varistor material is a polycrystalline sintered ceramic of zinc oxide (the primary metal oxide) containing additionally minor amounts of oxides of other metals (the additive metal oxides) such as $Al_2O_3$, $B_2O_3$, BaO, $Bi_2O_3$, CaO, CoO, $Co_3O_4$, $Cr_2O_3$, FeO, $In_2O_3$, $K_2O$, MgO, $Mn_2O_3$, $Mn_3O_4$, $MnO_2$, NiO, PbO, $Pr_2O_3$, $Sb_2O_3$, $SiO_2$, SnO, $SnO_2$, SrO, $Ta_2O_5$, $TiO_2$, or combinations thereof.

In a preferred method for making varistor materials for use in this invention, soluble salt precursors of the additive metal oxides are converted to the respective oxides and hydroxides in the presence of zinc oxide powder by a precipitant, commonly ammonium hydroxide. Preferably, the additive metal oxides or their precursors are combined with the zinc oxide, and then the precipitant is added to the mixture, although the reversed mixing sequence may also be used. The additive metal oxides precipitate onto or around the zinc oxide, to form a precursor powder which is an intimate mixture of zinc oxide and the additive metal oxides. The precursor powder is collected, dried, and formed into a desired shape (the green body) and sintered at an elevated temperature (typically 1000°–1400° C.) to develop the characteristic polycrystalline microstructure responsible for the varistor properties. During the sintering, any hydroxides are converted to the corresponding oxides. Eda et at., Japanese laid-open application no. 56-101711 (1981) and Thompson et at., U.S. Pat. No. 5,039,452 (1991), the disclosure of which is incorporated herein by reference, disclose suitable precipitation processes.

Other disclosures relating varistor materials which may be used include Matsuoka et al., U.S. Pat. No. 3,496,512 (1970); Eda et at., U.S. Pat. No. 4,551,268 (1985); and Levinson, U.S. Pat. No. 4,184,984 (1980). Additionally, varistor materials based on materials other than zinc oxide may also be used, for example silicon carbide, titanium oxide, strontium oxide, or strontium titanate varistors.

Varistor disks may have electrodes deposited on their end surfaces for improving electrical contact. The electrodes may be deposited by plasma spraying a conductor (e.g., aluminum), silk screening a conductive ink (e.g., silver ink), vacuum depositing a conductor, electroless plating, flame spraying, and the like.

The foregoing detailed description of the invention includes passages which are chiefly or exclusively concerned with particular parts or aspects of the invention. It is to be understood that this is for clarity and convenience, that a particular feature may be relevant in more than just passage in which it is disclosed, and that the disclosure herein includes all the appropriate combinations of information found in the different passages. Similarly, although the various figures and descriptions thereof relate to specific embodiments of the invention, it is to be understood that where a specific feature is disclosed in the context of a particular figure, such feature can also be used, to the extent appropriate, in the context of another figure, in combination with another feature, or in the invention in general.

What is claimed is:

1. A surge arrester, comprising a surge arresting means comprising at least one varistor element and having first and second opposed end surfaces and a lateral surface;

first and second electrically conductive terminals; each terminal having inner and outer facing end surfaces and a side surface; the inner facing end surface of the first terminal electrically contacting the first opposed end surface of the surge arresting means and the inner facing end surface of the second terminal electrically contacting the second opposed end surface of the surge arresting means; each terminal having a ridge projecting from the side surface thereof at a location adjacent to the inner facing end surface and circumscribing the side surface; the ridges serving as damage-tolerant sacrificial rooting points for an arc in the event of varistor element failure by presenting a substantial metal mass for the arc to erode away;

structural means for holding the first and second terminals in electrical contact with the surge arresting means and imparting structural strength to the surge arrester, disposed around the lateral surface of the surge arresting means and fastened to the first and second terminals at fastening sites on or near the side surface thereof; and a housing made of a polymeric material, wherein the polymeric material covers the surge arresting means, the structural means, and the fastening sites on the first and second terminals but leaves uncovered at least part of the ridges.

2. A surge arrester according to claim 1, wherein the surge arresting means comprises a plurality of varistor elements electrically connected in series and forming a stack of such varistor elements.

3. A surge arrester according to claim 1, wherein the surge arresting means comprises a single varistor element.

4. A surge arrester according to claim 1, wherein at least one ridge is continuous.

5. A surge arrester according to claim 1, wherein at least one ridge is discontinuous.

6. A surge arrester according to claim 1, wherein the polymeric material of the housing fills the space between the surge arresting means and structural means.

7. A surge arrester according to claim 1, further comprising a plurality of sheds on the housing, wherein the distance between each opposed end surface of the surge arresting means and the ridge on the terminal electrically contacting the opposed end surface is less than the distance between any of the sheds and the ridge, as measured on a projection onto the longitudinal axis of the surge arrester.

8. A surge arrester, comprising:

a surge arresting means comprising at least one varistor element and having first and second opposed end surfaces and a lateral surface;

first and second electrically conductive terminals; each terminal having inner and outer facing end surfaces and a side surface; the inner facing end surface of the first terminal electrically contacting the first opposed end surface of the surge arresting means and the inner facing end surface of the second terminal electrically contacting the second opposed end surface of the surge arresting means; each terminal having a ridge projecting from the side surface thereof at a location adjacent to the inner facing end surface and circumscribing the side surface; the ridges serving as damage-tolerant sacrificial rooting points for an arc in the event of varistor element failure by presenting a substantial metal mass for the arc to erode away; each terminal having a plurality of recesses on a surface facing the surge arresting means;

a plurality of elongate strength members disposed around the lateral surface of the surge arresting means but spaced apart therefrom; each strength member having first and second ends fitting into a respective recess and being tightly held therewithin by crimping of the terminal containing the recess and consequent deformation of the recess; the elongate strength members being held under tension and applying a compressive force to the surge arresting means; and a housing made of a polymeric material, wherein the polymeric material covers the surge arresting means, the strength members, and the lateral surfaces of the terminals underneath which lie the recesses but leaves uncovered at least part of the ridges.

9. A surge arrester according to claim 8, wherein the surge arresting means comprises a plurality of varistor elements electrically connected in series and forming a stack of such varistor elements.

10. A surge arrester according to claim 9, wherein at least one ridge is continuous.

11. A surge arrester according to claim 9, wherein at least one ridge is discontinuous.

12. A surge arrester according to claim 9, wherein further comprising a metal spacer between two adjacent varistor elements or between a varistor element and a terminal.

13. A surge arrester according to claim 12, wherein the metal spacer contains at least one passageway through which passes a strength member.

14. A surge arrester according to claim 9, wherein the strength members are made of fiberglass reinforced resin.

15. A surge arrester according to claim 9, further comprising a compression member for applying a compressive force to the varistor elements.

16. A surge arrester according to claim 8, wherein the surge arresting means comprises one single varistor element.

17. A surge arrester according to claim 8, wherein the polymeric material of the housing fills the space between the surge arresting means and structural means.

18. A surge arrester according to claim 8, further comprising a plurality of sheds on the housing, wherein the distance between each opposed end surface of the surge arresting means and the ridge on the terminal electrically contacting the opposed end surface is less than the distance between any of the sheds and the ridge, as measured on a projection onto the longitudinal axis of the surge arrester.

19. A surge arrester, comprising:

a surge arresting means comprising at least one varistor element and having first and second opposed end surfaces and a lateral surface;

first and second electrically conductive terminals; each terminal having inner and outer facing end surfaces and a side surface; the inner facing end surface of the first terminal electrically contacting the first opposed end surface of the surge arresting means and the inner facing end surface of the second terminal electrically contacting the second opposed end surface of the surge arresting means; each terminal having a ridge projecting from the side surface thereof at a location adjacent to the inner facing end surface and circumscribing the side surface; the ridges serving as damage-tolerant sacrificial rooting points for an arc in the event of varistor element failure by presenting a substantial metal mass for the arc to erode away;

a filament winding of an electrically non-conductive material wrapping over shoulders on the terminals and applying a compressive force to the surge arresting means; and a housing made of a polymeric material, wherein the polymeric material covers the surge arresting means, the filament winding, and the shoulders on the first and second terminals but leaves uncovered at least part of the ridges.

20. A surge arrester according to claim 19, wherein the surge arresting means comprises a plurality of varistor elements electrically connected in series and forming a stack of such varistor elements.

21. A surge arrester according to claim 20, wherein the filament winding is fiberglass impregnated with a polymeric resin.

22. A surge arrester according to claim 20, further comprising a compression member for applying a compressive force to the varistor elements.

* * * * *